(12) United States Patent
Chekavskyy et al.

(10) Patent No.: US 12,665,496 B2
(45) Date of Patent: Jun. 23, 2026

(54) METHOD FOR PREVENTING SATURATION OF A TRANSFORMER DURING FAST VOLTAGE CHANGES AND A CONTROL SYSTEM THEREOF

(71) Applicant: ABB Schweiz AG, Baden (CH)

(72) Inventors: Glib Chekavskyy, Cracow (PL); Piotr Sobanski, Cracow (PL); Milosz Miskiewicz, Cracow (PL); Grzegorz Bujak, Wieliczka (PL)

(73) Assignee: ABB Schweiz AG, Baden (CH)

( * ) Notice: Subject to any disclaimer, the term of this patent is extended or adjusted under 35 U.S.C. 154(b) by 190 days.

(21) Appl. No.: 18/606,660

(22) Filed: Mar. 15, 2024

(65) Prior Publication Data

US 2024/0275271 A1      Aug. 15, 2024

Related U.S. Application Data

(63) Continuation of application No. PCT/EP2022/074920, filed on Sep. 7, 2022.

(30) Foreign Application Priority Data

Sep. 17, 2021    (EP) ..................................... 21197507

(51) Int. Cl.
H02M 1/40          (2007.01)
H02M 1/00          (2007.01)

(52) U.S. Cl.
CPC ........... H02M 1/40 (2013.01); H02M 1/0025 (2021.05)

(58) Field of Classification Search
CPC ............................... H02M 1/40; H02M 1/0025
See application file for complete search history.

(56) References Cited

U.S. PATENT DOCUMENTS 9,391,504 B2      7/2016  Karlsson et al.

FOREIGN PATENT DOCUMENTS

| EP | 3734822 A1 | * | 11/2020 | ............... H02M 1/40 |
| WO | WO-2012022353 A2 | * | 2/2012 | ................ H02P 9/00 |
| WO | WO-2019218423 A1 | * | 11/2019 | ............... H02H 7/04 |

OTHER PUBLICATIONS

Abb Switzerland Ltd., "AC 800PEC: The high-performance control system for model-based design," downloaded from the Internet on Jan. 17, 2024, at https://library.e.abb.com/public/a7566254919255a0c12578c3003355f7/AC%20800PEC%20Sales%20Brochure.pdf, sales brochure, 12 pp. (2011).

(Continued)

*Primary Examiner* — Crystal L Hammond
*Assistant Examiner* — Jennifer C Caulk
(74) *Attorney, Agent, or Firm* — Fitch Even Tabin & Flannery LLP

(57) ABSTRACT

A control method for preventing saturation of a transformer during fast voltage changes by correction of magnetic flux of the transformer, the transformer having a primary winding with a power electronic converter and a secondary winding, the control method including estimating or measuring a primary signal including a primary voltage on the primary winding of the transformer and a primary current on the primary winding of the transformer, and injecting a correction signal including a correction voltage into the primary winding of the transformer so as to prevent saturation of the transformer.

8 Claims, 8 Drawing Sheets

(56)     References Cited

OTHER PUBLICATIONS

Miskiewicz et al., "ABB's ACS6000 Power Electronics Grid Simulator, PEGS, tests medium voltage equipment," *ABB Review*, 2: 40-45 (2020).

Sankala et al., "Flux and Winding Current Balancing Control for a Medium-Frequency Six-Winding Transformer," *IECON 2014—40th Annual Conference of the IEEE Industrial Electronics Society*, 1473-1479 (Oct. 29-Nov. 1, 2014).

Wuyun et al., "Phase Control to Eliminate Inrush Current of Single-Phase Transformer by Using Approximate Calculation of Residual Flux," *2006 International Conference on Power System Technology* (*PowerCon*), 6 pp. (Oct. 22-26, 2006).

European Patent Office, International Search Report in International Patent Application No. PCT/EP2022/074920, 3 pp. (Dec. 23, 2022).

European Patent Office, Written Opinion in International Patent Application No. PCT/EP2022/074920, 5 pp. (Dec. 23, 2022).

European Patent Office, Extended European Search Report in European Patent Application No. 21197507.3, 5 pp. (Mar. 30, 2022).

* cited by examiner

METHOD FOR PREVENTING SATURATION OF A TRANSFORMER DURING FAST VOLTAGE CHANGES AND A CONTROL SYSTEM THEREOF

CROSS-REFERENCE TO RELATED APPLICATIONS

The instant application claims priority to International Patent Application No. PCT/EP2022/074920, filed Sep. 7, 2022, which is incorporated herein in its entirety by reference.

FIELD OF THE DISCLOSURE

The instant application generally relates to transformers and, more particularly, to a method for preventing saturation of the transformer during fast, dynamic voltage changes.

BACKGROUND OF THE INVENTION

Controllable voltage-source inverters with an output transformer, which is used to adjust voltage of converter and supplied power circuit, operating in a reference tracking mode (grid simulators, grid-tied converters, grid-forming converters) often experience very fast changes of output voltage (specifically, rapid changes of magnitude, phase and/or frequency of the voltage). Traditionally, a control system of such inverters controls instantaneous angle of the voltage phase.

Known in the prior art are methods of evaluation of prospective magnetic flux at expected switching, and thus adopting time instance, which is the most favorable to avoid inrush currents—employing means which are non-simultaneous switching in multiphase converters in particular in three-phase converters. In present patent description magnetic flux is used as basic characteristic of operational state of transformer magnetic core, any other magnetic variable can be used in the same extend (such as magnetization current, magnetic flux density, magnetic field intensity).

Such methods are not acceptable for grid simulators because the switching can be requested at any time instance. Another known method is to balance of the magnetic flux in a close loop, using estimated value of actual variable as feedback. This solution uses a posteriori knowledge, its effectiveness depends on flux control performance (i.e. accuracy, reaction time, allowed value of corrective action), which is usually limited in a real system. Still another known solution is to bring the magnetic flux to favorable conditions that allow to avoid transformer flux transient (therefore, saturation) before switching on.

Converter for flux control is described in U.S. Pat. No. 9,391,504B2, which discloses a control circuit generating a control signal to control a duty cycle of a switched mode power supply such that the magnetic flux density in the transformer is balanced (with minimized DC component), thereby preventing saturation of the transformer core. The control circuit comprises a flux density calculator and a regulator. The flux density calculator receives a signal indicative of the input voltage of the switched mode power supply and a feedback signal comprising the generated control signal, and it generates therefrom an average flux density signal. The regulator receives the generated average flux density signal and a signal indicative of the output voltage of the switched mode power supply, and generates the control signal in dependence upon the average flux density signal, the reference flux density signal, the signal indicative of the output voltage and a reference voltage signal. This solution considers steady state operation, and does not have components which will help to prevent unfavorable transients at sudden voltage changes.

WO2019218423A1 discloses a flux linkage control-based transformer and a magnetizing inrush current suppression method. A small-capacity DC/AC converter is connected to a secondary winding or auxiliary winding of the transformer; before no-load switch-on, the phase of a primary grid voltage is detected; a reference instruction of core flux linkage is exported according to the relationship between a winding voltage and the core flux linkage. A core flux linkage closed-loop PI control system is constructed in a synchronous rotating coordinate system to control an output voltage of the converter, so that the core flux linkage performs static error free tracking on a flux linkage reference value, thereby pre-establishing, in the core, a sinusoidal synchronous flux linkage having a phase difference of 90 degrees from the grid voltage before no-load switch-on. By means of the solution, no matter when the transformer is switched on, the core flux linkage is directly in a steady state without a transient process, thereby completely eliminating magnetizing inrush current. This solution considers utilization of additional winding (or connection to existing winding) with another controlled converter which brings flux to steady state operation prior to switching on, thus, transient is avoided.

Another known solution requires estimation of residual flux which can be approximately calculated from the last ending excitation current and time-effect character of ferromagnetic-core, then combined with entering phase control and inrush can be avoided. This paper firstly purposes a method to calculate residual flux approximately; secondly, the strategy of entering phase control of single-phase transformer has been analyzed; finally a EMTP test has been taken to test its feasibility.

Non-simultaneous switching is not acceptable in state-of-art grid forming converters (incl. grid simulators) and avoided in proposed solution.

Another known solution describes a control algorithm that balances the flux and the winding currents of a one-phase six-winding medium-frequency transformer was proposed. Two parallel control loops both employing PI-controllers, are used. The first control loop stabilizes the flux of the transformer by adjusting the average value of the magnetizing current to zero. The second control loop operates at ten times longer time step than the first controller and adjusts the average values of individual winding currents to zero. Flux is balanced (zero mean value) thanks to magnetization current average value feedback. This value calculated as average from two previous peak values of the current. This solution utilizes the same idea as the basic flux control structure, and does not prevent from potentially unfavorable transient with supreme dynamic, as corrective action is generated a posteriori.

BRIEF SUMMARY OF THE INVENTION

The systems and methods in accordance with the present disclosure balance the magnetic flux of the transformer during the fast transients, for example, at rapid or high-magnitude voltage change at arbitrary time instance, so as to keep it within operational limits, not reaching saturation area. The solution does not process the requested, potentially unfavorable change of output voltage of converter immediately, which can lead to dynamic transformer flux transient with entering of saturation area, but introduces predictive control technique based on preventive on-line evaluation and assessment of prospective magnetic flux trajectory during transient, and following correction of voltage trajectory required to avoid saturation of magnetic core. Depending on utilized control platform specifications, it can be realized as introduced processing delay between voltage change request acceptance and its generation with power unit, or as additional computational effort required for on-line prediction and correction. None of the prior art solutions provides a reliable method having advantages as listed above.

A method and control system in accordance with the present disclosure is configured to bring the magnetic flux to any dedicated value within a normal operational range of a magnetization curve by balancing the flux of the transformer during the fast transients at rapid or high-magnitude voltage change at arbitrary time instance to keep flux within operational limits, below the saturation area.

Embodiments in accordance with the disclosure relate to a predictive control method for preventing saturation of a transformer (TR) during fast voltage changes by correction of magnetic flux of the transformer (TR), said transformer (TR) having a primary winding with a power electronic converter (PEC) and a secondary winding, by estimating or measuring a primary signal (ii), including a primary voltage on the primary winding of the transformer (TR) and optionally a primary current on the primary winding of the transformer (TR), and injecting a correction signal including a correction voltage, into the primary winding of the transformer (TR) so as to prevent saturation of the transformer (TR), said method comprising following steps:

Acknowledgement of the commanded change of converter voltage, to be applied to the primary winding of the transformer (TR), including initial values of voltage angle, voltage parameters and voltage change parameters on the primary winding of the transformer (TR) as the primary signal (ii), Generating a reference signal including a reference voltage signal $U^*$ by a referencing unit (RU), Inputting the reference voltage signal $U^*$ to a reference flux trajectory calculator (RF) which—based thereon—calculates a reference flux $\Phi^*$, Inputting a combination of the reference magnetic flux $\Phi^*$ and the estimated magnetic flux to a flux controller (FC), which—based thereon—generates a correction term $\Delta U^*$, Generating the corrected reference signal, comprising a correction term, $U^{}$, wherein $U^{}=U^*+\Delta U^*$, Inputting the corrected reference voltage signal $U^{**}$ and (optionally) load of the secondary winding of the transformer (TR) and its change in time, to a flux estimator (E), which—based thereon—calculates an estimated flux $\Phi$, Injecting the correction signal through the power electronic converter (PEC) into the primary winding of the transformer (TR), wherein the following steps are performed by an auxiliary predictive control unit (ACU), which contains the reference mathematical model of the system (RM):

Initialization of the mathematical model of the system (RM) with the acquired initial values of voltage angle and voltage parameters, as well as the acquired or pre-configured voltage change parameters, Calculation of an expected magnetic flux trajectory $\hat{\Phi}(t)$ using the mathematical model of the system (RM), Classifying the expected magnetic flux trajectory $\hat{\Phi}(t)$ so as to predict if saturation of the transformer (TR)

is expected to happen by establishing its mean value, its maximal value $\hat{\Phi}_{max}$ and its minimal value $\hat{\Phi}_{min}$ and comparing them against a pre-determined magnetic core saturation limits $\pm\Phi_{sat}$, Evaluating a flux trajectory correction $\Delta\Phi^*(t)$ at which saturation would be avoided, or its occurrence would be minimized, and Inputting the flux trajectory correction $\Delta\Phi^*(t)$ into the flux controller (FC) as an additional signal used by the flux controller (FC) to generate the correction term $\Delta U^*$, wherein step g) is initialized with the same initial conditions which are used for the initialization of the mathematical model of the system (RM) in step h).

BRIEF DESCRIPTION OF THE SEVERAL VIEWS OF THE DRAWING(S)

FIG. 1 is an exemplary voltage change chart in accordance with the disclosure.

FIG. 2a is a control system schematic diagram shown in a general case, and FIG. 2b is a control schematic diagram shown after implementation of an auxiliary predictive control unit, where PEC—power electronic converter; TR—output transformer; RF—reference flux calculator; E—flux estimator; FC—flux controller; RU—referencing unit; ACU—auxiliary control unit; PM—plant model; RM—reference model; RA—system response analyzer.

Figure 5A:
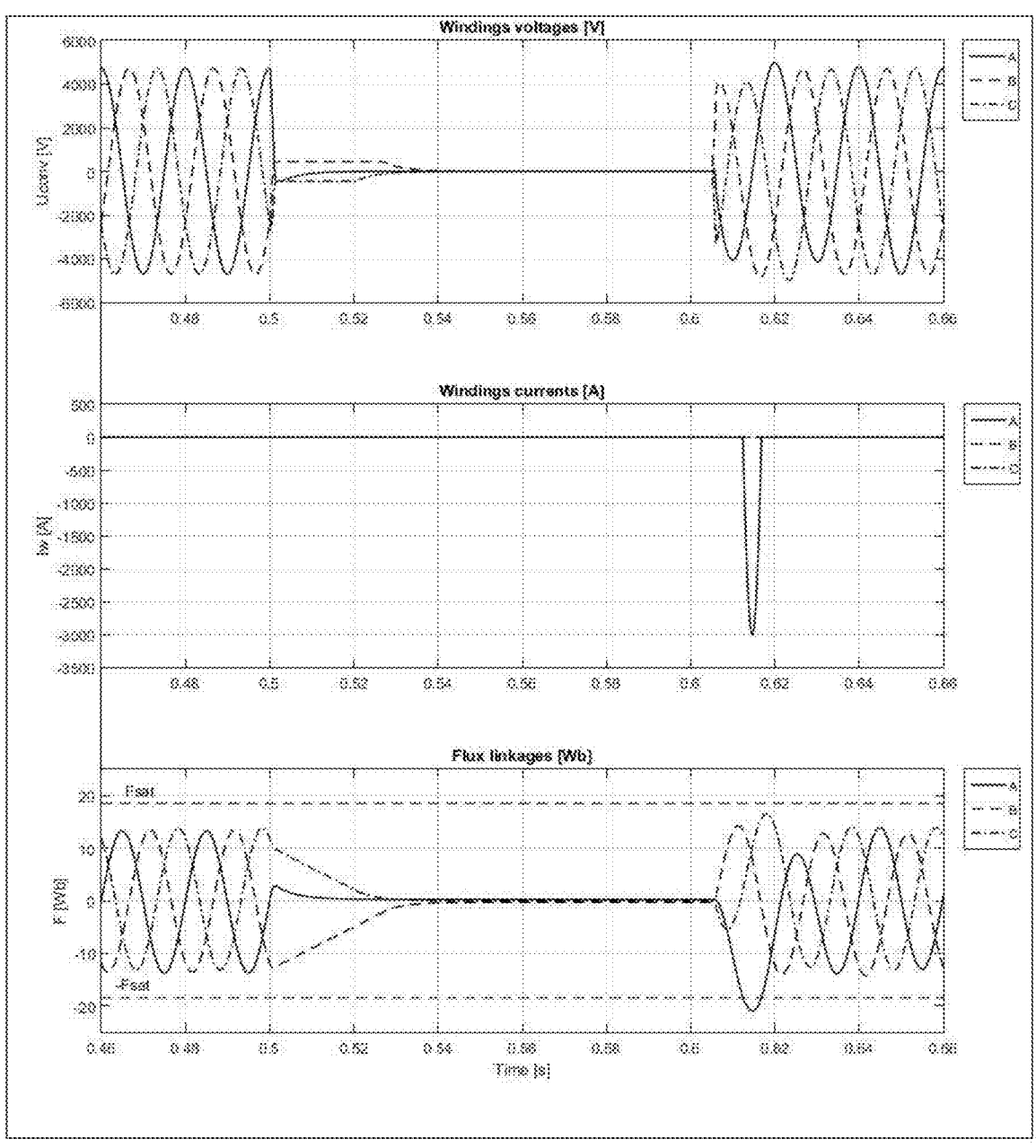
Figure 5B:
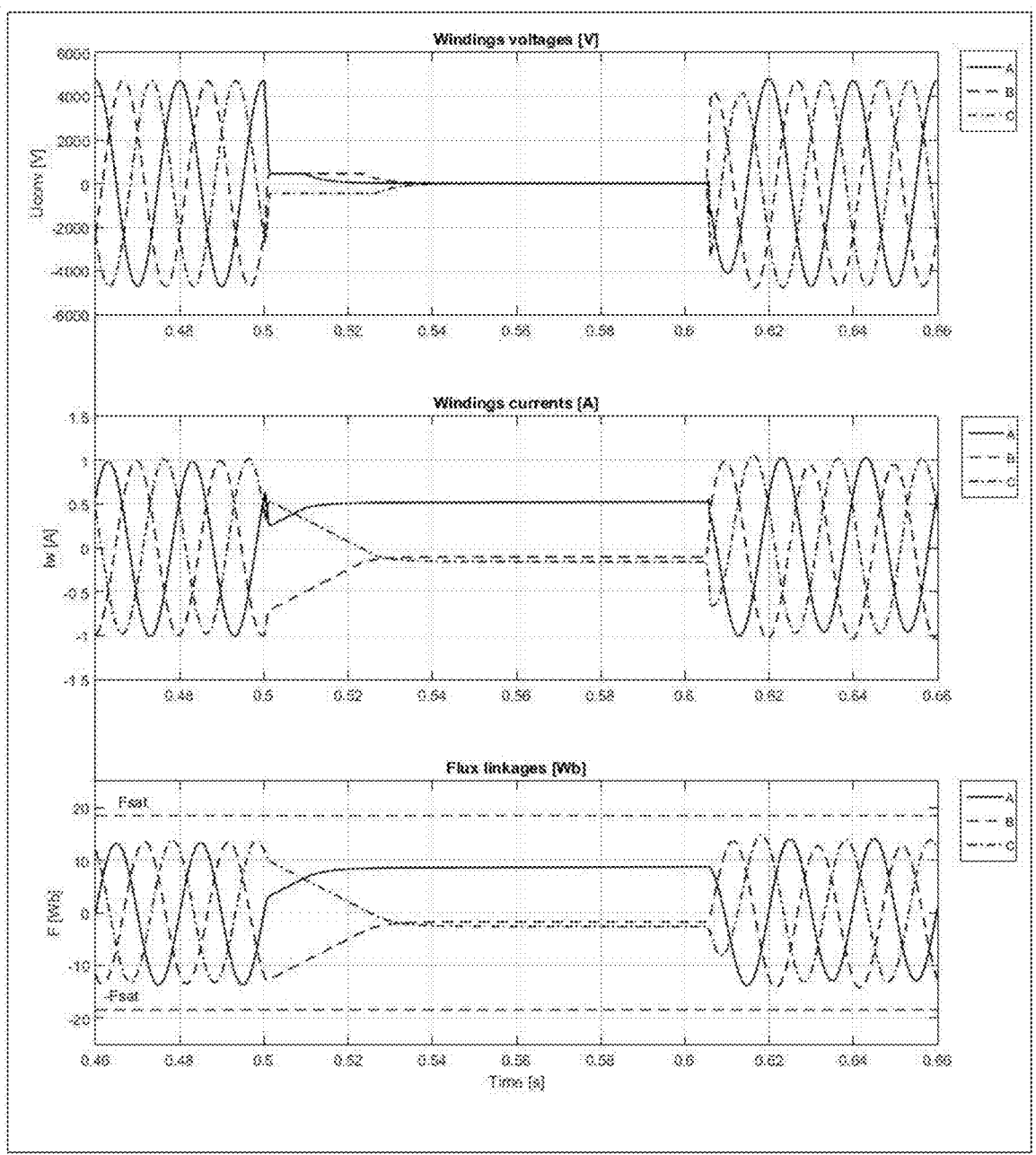

FIGS. 5a and 5b are graphs of winding voltages, currents and estimated magnetic flux linkages at zero voltage ride through test (full voltage magnitude change in 1 ms) with max. 10% correction of reference voltage trajectory having basic flux control (FIG. 5a), and with additional flux trajectory correction (FIG. 5b), in both cases, with no saturation, and room ca.30% to increase test voltage, in accordance with the disclosure.

Figure 6A:
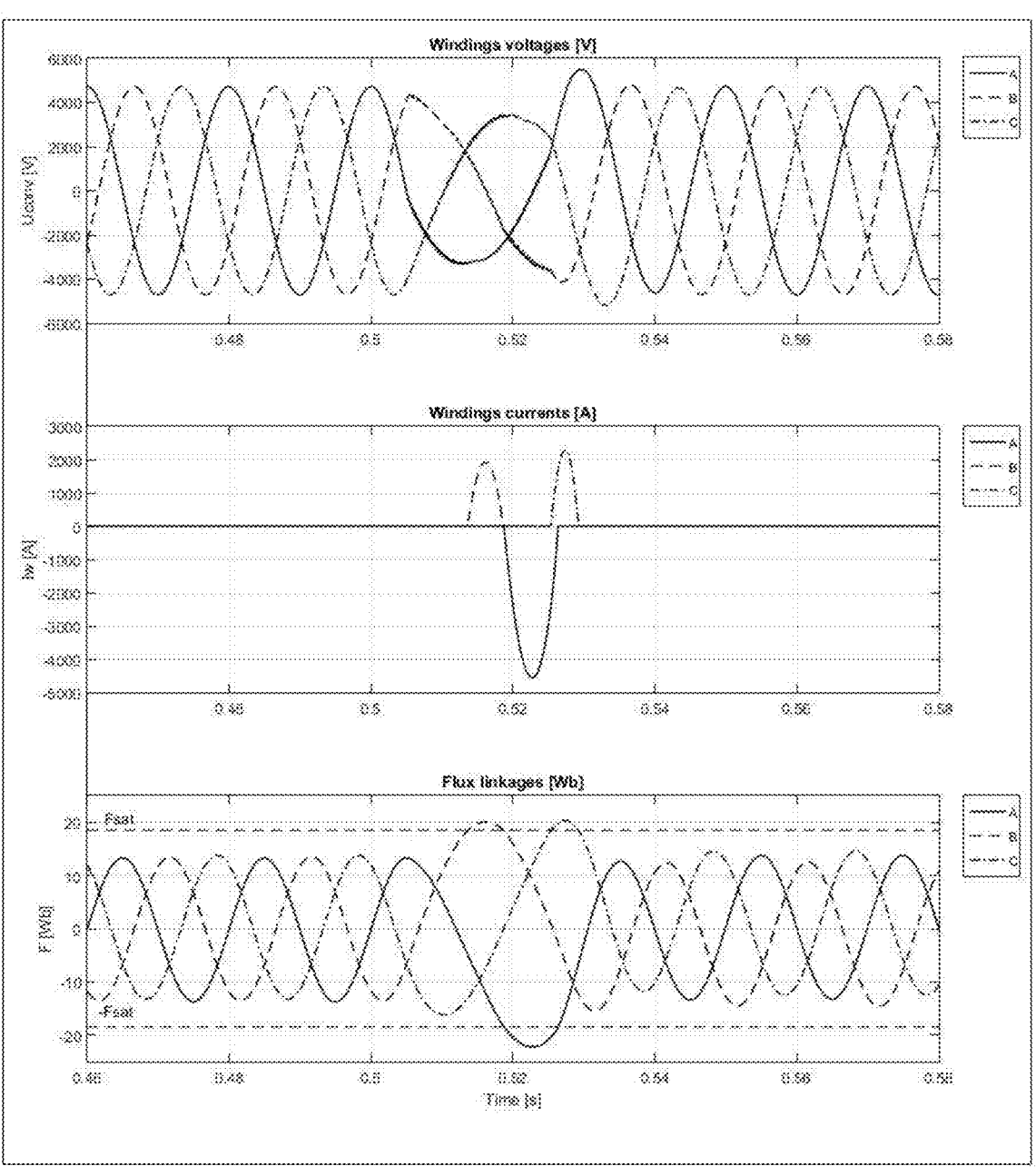
Figure 6B:
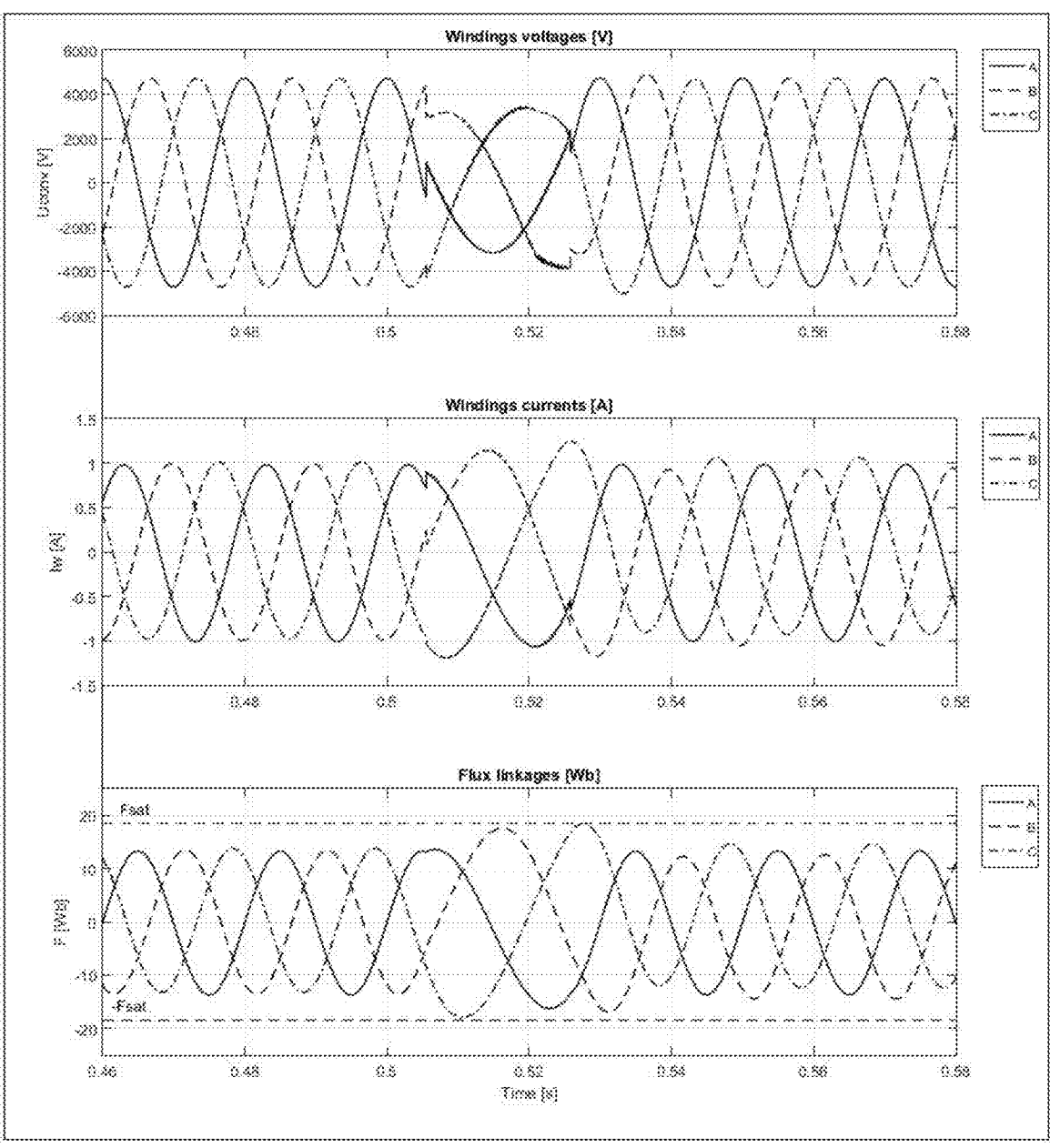

FIGS. 6a and 6b are charts of winding voltages, winding currents and estimated magnetic flux linkages during execution of phase jump test (180 deg/1 cycle) with max. 30% correction of reference voltage trajectory having basic flux control (FIG. 6a), or with additional flux trajectory correction (FIG. 6b).

DETAILED DESCRIPTION OF THE INVENTION

The present disclosure relates to a predictive control method with evaluation of prospective magnetic flux at expected transient, in order to provide the safe initial condition of the flux, which allows to minimize the inrush currents. Proposed solution adopts initial value of the flux, not time instance, in order to provide the favorable transient, which is applicable to simultaneous switching in multiphase applications with extreme dynamic. Proposed solution targets to forecast the unfavorable transient in advance, and apply correction during dynamic stage of the process in order to prevent undesired transient, in contrast to its suppression a posteriori. The method does not require additional hardware. Instead, the intermediate procedure introduced between the voltage change request acknowledgement and issuing the permission for its processing by power unit, which required in order to evaluate required flux trajectory correction.

In medium-voltage power electronic converter (PEC) based applications the load and PEC are usually coupled by the transformer (TR). Because the magnetic capacity of TR is limited, it is proposed, that prior to processing of output voltage change request by PEC control system, this request is analyzed by auxiliary predictive control unit (ACU), which contains reference mathematical model of the system (RM) and system response analyzer (RA). If RA detects, that requested voltage change will push TR flux beyond the saturation level, it generates offset to the main reference, which is applied during voltage change processing, helping to keep the flux far from the saturation area.

The method is an extension (supplement) to the basic PEC output voltage control algorithm, which, if activated, allows to prevent TR from saturation or reducing pre-conditions for saturation, and (or) allows to tolerate noticeably higher dynamic and magnitudes of output voltage change.

Problem description: In medium voltage power electronic converter (PEC) based applications with transformer on the output, the rate of output voltage change has to be limited because of limited size, and thus finite magnetic capacity of the transformer. As the voltage change, any change of voltage characteristic (magnitude, frequency, phase) is considered, which performed in controllable manner in order to drive converter from one stable steady-state operational mode to another stable steady-state operational mode (FIG. 1) at the finite time interval [$t_s$, $t_f$].

During high-dynamic voltage changes, especially at non-controlled initial conditions, due to the remnant (residual) magnetic flux, at unfavorable voltage angle, flux of transformer at transient can become too high, causing its saturation, and as consequence, overcurrent flow. This often causes interruptions in normal operation of the system.

Such well-known case as inrush currents at connecting the TR to the power supply, is the particular case of the problem. Another examples are special, demanding multi-phase PEC-based applications, used for testing and certification of power equipment (for example, grid simulator [1]), which require accurate tracking of the requested voltage trajectory in order to emulate various test conditions, and thus, should be capable of performing requested voltage change at arbitrary time instance.

For those applications, traditional solution, such as switching at favorable voltage angle, when flux crosses zero level, is not applicable.

Figure 2A:
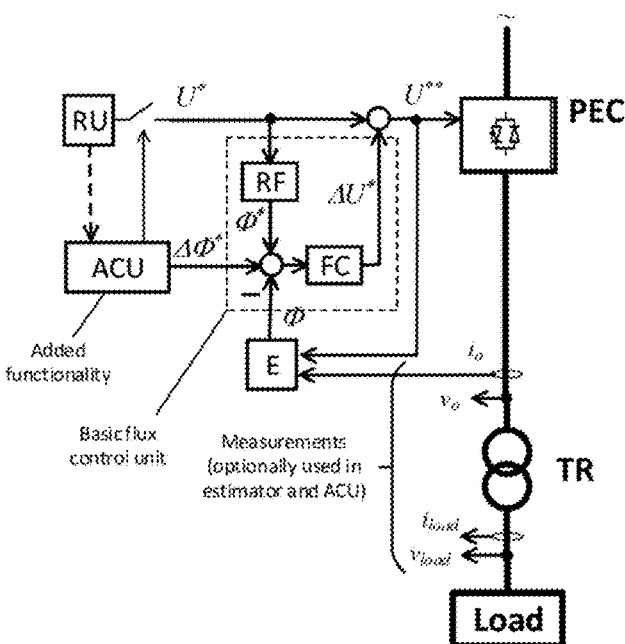
Figure 2B:
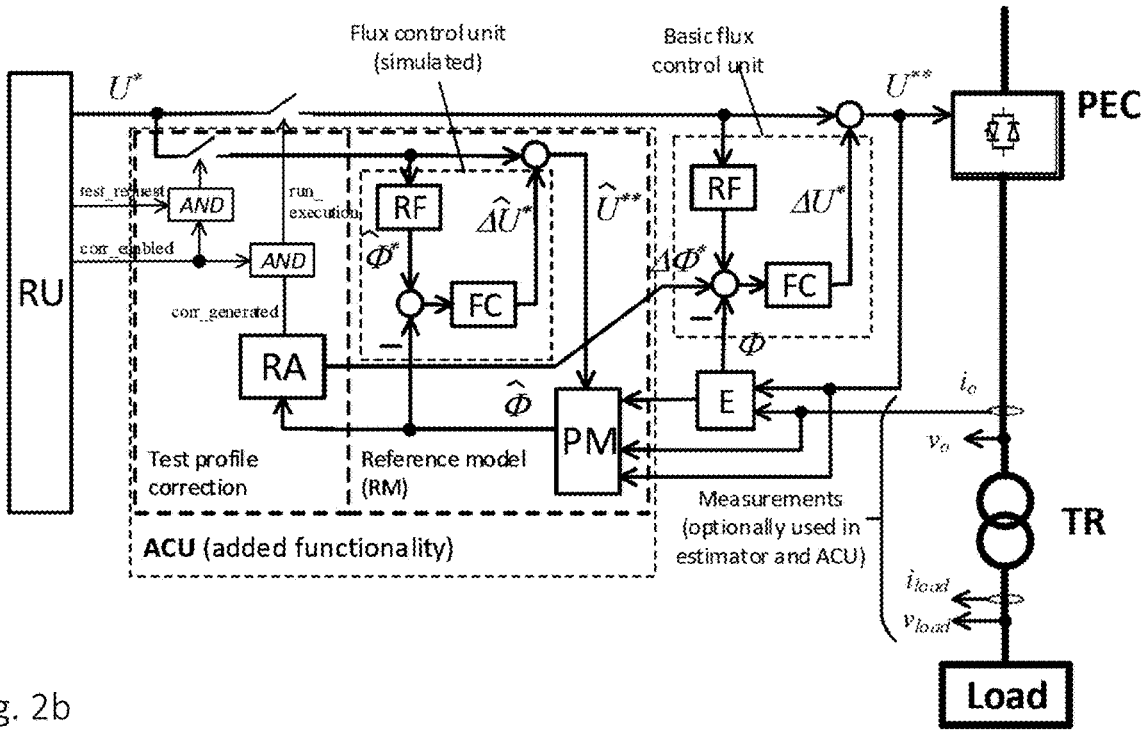

To allow simultaneous switching at arbitrary initial conditions instead, traditionally, residual magnetic flux is controlled with the dedicated closed control loop. Diagram shown on FIG. 2 is an example of the PEC open-loop voltage referencing system with closed transformer flux control loop. For multiphase applications the control has similar structure among phases [depending on transformer design, decoupling of transformer phases can be required].

Referencing unit (RU) is a testing voltage trajectory generator, which comprises pre-configurable profile or uses online tracking of external references. With respect to the invention, it is important that auxiliary predictive control unit (ACU) is synchronized with RU in order to acknowledge upcoming voltage change request and apply further the procedure of analysis.

Power unit contains of power electronic converter PEC, which, by means of output transformer TR is connected to the load (or to the grid, or to another PEC-based system). Usually input and output currents of the transformer, as well as output voltage, are measurable.

Basic control system operates in such a manner that output voltage of PEC, $v_0$ follows the control voltage U** with acceptable accuracy. The latter voltage composed, traditionally, from two components: reference U*, generated by referencing unit RU, and limited correction ΔU* fed by the flux controller FC:

$$U^{**} = U^* + \Delta U^* \tag{1}$$

Basic magnetic flux control is built as closed control loop, which includes reference flux trajectory calculator RF, flux estimator E and flux controller FC. Flux estimator E performs magnetic flux estimation on-line with use of mathematical model of transformer, for example, well-known and widely used equation:

$$u = r \cdot i + N \cdot \frac{d\Phi}{dt} \tag{2}$$

In equation (2), u is voltage applied across the winding, i is winding current, Φ is the magnetic flux created by the winding, and N is number of turns of the winding.

If reference voltage defined as $$U^*(t) = U_m^* \cos(\omega^* t + \varphi^*) \tag{3}$$

the main component of reference magnetic flux (desired flux trajectory) is defined using equation (2), written for the reference values under assumption that power losses in the winding are negligible:

$$\Phi^*(t) = \frac{U_m^*}{\omega^*} \sin(\omega^* t + \varphi^*) \tag{4}$$

thus, reference flux magnitude is proportional to the ratio of reference voltage magnitude and voltage frequency.

Reference magnetic flux is continuously being compared against estimated flux Φ, error signal is being fed to flux controller, with generated correction term ΔU* to voltage reference.

The strategy of closed-loop flux control is to balance the instantaneous magnetic flux with respect to zero mean value, targeting it to have zero mean value. Acting of flux controller it is visible as correction of voltage trajectory with the offset, usually limited in value. This solution is commonly used, even though response time of control is not always negligible, but usually provides acceptable effect. Nonetheless, in case when system operates with supreme dynamic, as at increased rate and amplitude of voltage change, at arbitrary time instance it still does not prevent TR from saturation, as because of limited magnetic capacity of transformer, as due to finite (non-zero) flux control loop reaction time.

Auxiliary predictive control unit (ACU), shown on FIG. 2, is proposed for use in order to realize the core idea of present invention, as a supplement to the basic control strategy. This unit contains reference mathematical model of the system (RM), and realizes function of evaluation prospective response of the system, with particular focus on flux trajectory.

Figure 3:
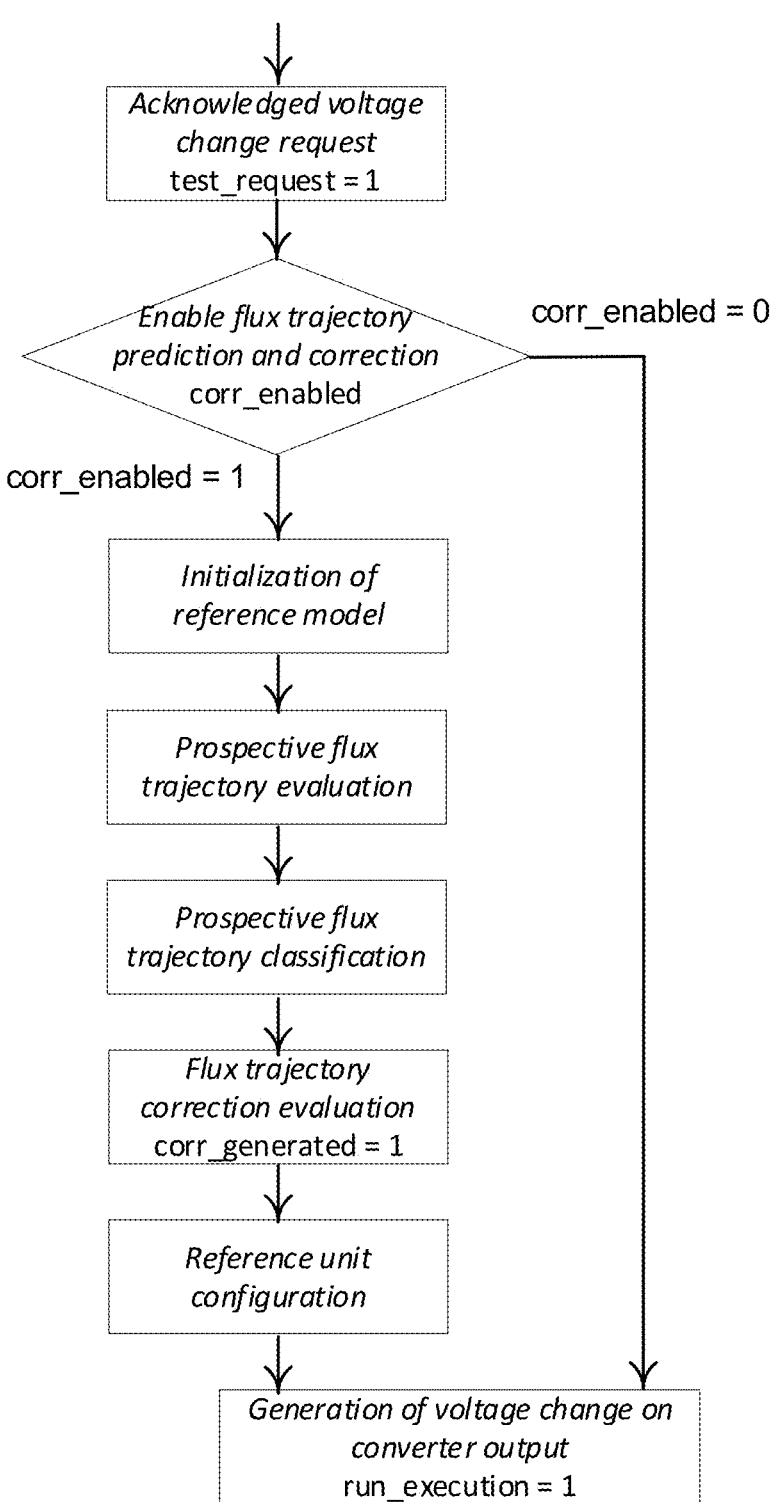
FIG. 3 is a flowchart for a method in accordance with the disclosure.

According to the present disclosure, during regular operation of the system, any demanding voltage change request, which potentially can lead to dynamic transformer flux transient with entering of saturation area, undergo preliminary analysis, with stages, indicated at flowchart FIG. 3. This analysis is performed using transformer mathematical model, at basic case, the same model, which is used in estimator E of basic control unit, for example, (2), which describes electromagnetic process in transformer, thus allows to determine, whether the requested change will cause magnetic flux to enter saturation area.

The same mathematical model, for example, as shown in equation (2), is used to solve adjacent problem—to determine voltage correction, $\Delta U$, required in order to evaluate correction, $\Delta\Phi^*$ (FIG. 4) to the flux reference, which will keep flux apart from saturation area. This correction is injected during the time of execution of the requested output voltage change by the system. In fact, this improvement is exposed by the electromagnetic induction law, and especially by the fact that the magnetic flux created by the winding with the magnetic core, can be set to any predefined value within operational range by injection of dc component into the voltage applied across the winding, for limited period of time, prior to activation of the potentially unfavorable transient.

As reasonable consequence, this improvement assumes, that voltage change request is not allowed to be processed immediately, but with certain time delay (FIG. 4), its value depends on predictive control algorithm performance and required computational effort (utilized mathematical model of system, system response prediction strategy), and on controller performance (computing power, available memory). In special cases, when the parameters of expected voltage change are known in advance, and used RM is not too computationally expensive, required calculations can even be performed online, during one cycle of control algorithm execution.

Method according to the invention comprises below mentioned steps (FIG. 3, FIG. 4) which are introduced by ACU prior to voltage request processing (i.e. physical change of voltage on PEC output):

Initialization of RM with the captured or pre-configured initial values (voltage angle, voltages parameters), as well as voltage change parameters.

Generally, RM shall include detailed model of the flux control unit (FIG. 2) and mathematical models of the PEC and TR, to simulate the prospective response of the system. The procedure is relatively simple, if system is able to command voltage angle ($\omega t$), or to estimate it online (e.g. using voltage phase-locked loops, PLL), which is a widely used and well known technique.

Then ACU has to capture the angle value $\omega t_0$ (normally scaled in range from 0 to $2\pi$ rad) at time moment which corresponds to acknowledged test request appearance to, as well as evaluate magnetic flux initial condition $\Phi_0$ at time instance $t_0$ (instantaneous value of flux generated at the output of flux estimator at any time instance).

Prospective flux trajectory evaluation—the captured or pre-configured voltage change applied to RM, which calculates the expected flux trajectory.

Figure 1:
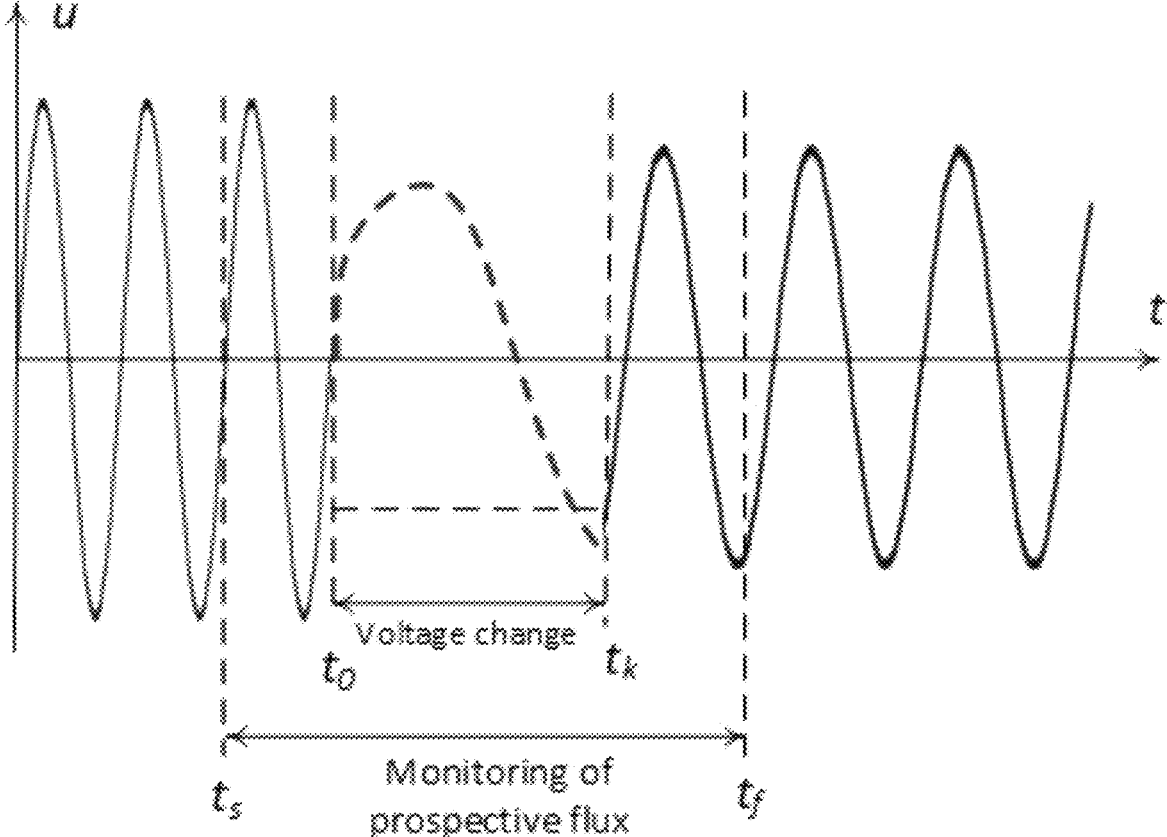

System reaction, $\hat{\Phi}(t)$, has to be calculated, and further analyzed, on time interval $t=[t_s, t_f]$ (prediction horizon), which, in general, covers all transient operation of the system between two regular steady-state operation modes (see FIG. 1).

In general case, it is recommended that prediction horizon [ts, tf] includes steady state time interval [ts, t0] just before test request, and also steady state time interval [tk, tf] after voltage change emulation has been finalized; duration of each interval is at least one cycle of the voltage, in order to emulate normal, non-disturbed operation before voltage change request, as well as the operation immediately after voltage change, when the most dynamic transient in the system is expected to happen, caused by performed voltage change.

Prospective flux trajectory classification—ACU evaluates if TR saturation is expected.

The above calculated reaction is processed by detection of its mean value, the maximal $\hat{\Phi}_{max}$ and the minimal $-\hat{\Phi}_{min}$ estimated instantaneous values of the magnetic flux (those have opposite signs), and comparison against magnetic core saturation limits $\pm\Phi_{sat}$. As a result, the declaration, whether saturation is expected to happen, and whether correction of flux reference trajectory is required, has to be generated.

Flux trajectory correction evaluation—evaluation of the required correction to the flux reference.

Flux reference correction calculation, in general case, shall consider available rooms in magnetic core, both from positive and negative sides, and suggest the trajectory $\Phi^*(t)+\Delta\Phi^*(t)$, at which saturation will be avoided, or its occurrence will be minimized. In simpler case, if default trajectory defined by equation 4, the required correction has to balance the magnetic flux with respect to expected mean value during voltage change processing:

$$\Delta\Phi^*(t) = k \cdot \left(\hat{\Phi}_{max} - \hat{\Phi}_{min}\right) = const \qquad (5)$$

with value of k in range from 0 to 1—correction factor, which has to be chosen depending on test scenario, but also considering control performance of the flux control unit.

Reference unit configuration—voltage change processing execution has to be initialized with the same initial conditions that were used at RM initialization (stage 1), with initial value of flux trajectory, determined at stage 4.

Voltage change request processing has to be performed at voltage angle value $\omega t_0$ (scaled within the range from 0 to $2\pi$ rad), at initial flux value $\Phi_0(t_0)$, with correction, initialized at $\Delta\Phi^*$ ($t_0$).

After releasing the permission for voltage change request processing, magnetic flux is expected (during transient) to follow corrected trajectory, with the bias in comparison to default one, moving it away from [the closest] saturation level. Acting of the upgraded control, as before, is visible as limited deviation of voltage from its reference trajectory. Deviations of actual magnetic flux from the requested corrected reference flux trajectory can still happen due to limited bandwidth of flux control.

Magnetic flux trajectory correction is applied during transient stage of voltage change execution. Because it is expected that the system comes to stable, regular steady-state operation after the voltage change, there is no need to handle any non-zero additional flux, and any corrective flux reference has to be zeroed.

Example 1: Three-phase PEC-based system in application for testing and certification of power equipment, three-phase supplies a TR which is disconnected from the load, and emulates test conditions, with voltage magnitude rapid change from nominal value to zero, with the consecutive rapid voltage recovery, both commanded at arbitrary time instances, simultaneously in all phases.

Examined voltage change—voltage sag with consecutive recovery.

Transient stage of the process—time interval between start of voltage sag and finalization of voltage recovery.

Simulated behavior of the system with default flux control structure is shown in FIG. 5a, whereas simulated behavior of the system with flux correction is shown in FIG. 5b. In both cases flux controller injects additional voltage (limited in this case to max. 10% of nominal voltage) in order to bring the flux to the required value, visible as limited voltage distortion immediately after voltage sag or voltage recovery starts (for approx. 30 ms). Values shown on the plot: expected winding voltages (top), expected winding currents (middle), estimated flux (bottom).

In default case (FIG. 5a), after voltage sag, the flux controller brings flux to the zero, in correspondence with equation (4). This zero value is an initial condition for the upcoming recovery request, which, in general is not favorable for all phases, and, as it is seen from simulated flux behavior, leads to the deep saturation in phase A, and also bring flux in phase C close to the saturation. Deep saturation in phase A causes overcurrent, and can interrupt converter operation.

In the alternative case (FIG. 5b), with introduced predictive control, ACU utilizes information, gathered from emulation of default operation of the system (processes to be similar FIG. 5a, and determines required correction to flux reference, calculated based on equation 5, with k=1. During the next, delayed voltage change request processing [with the same voltage and flux initial conditions], correction is applied to the flux reference during the transient process. As result, process at recovery will not lead to saturation.

It is important to note that the similar idea can be used for saturation prevention during the connection of non-magnetized transformer to the grid. Solution is to bring the flux to initial conditions, appropriate to the switching at known voltage angle, in contrast to the traditional solution on adoption of switching time in each phase, to provide the favorable transient.

Example 2: Three-phase PEC-based system in application for testing and certification of power equipment, supplies a three-phase TR which is disconnected from the load, and emulates test conditions, with voltage phase change −180 deg/20 ms, commanded at arbitrary time instance, simultaneously in all phases. Examined voltage change—voltage phase jump. Transient stage of the process—time interval between initiation of the voltage change, and finalization of phase change, duration is 20 ms.

Simulated behavior of the system with default flux control structure is shown in FIG. 6a), whereas simulated behavior of the system with flux correction (equation 5) is shown in FIG. 6b). In this case additional voltage, injected by flux controller, is limited to max. 30% of nominal voltage (to provide adequate room for control action), to ensure reasonable tracking of the required flux trajectory $\Phi^*(t)$, defined by equation 4. Values shown on the flow chart FIG. 6: expected winding voltages (top), expected winding currents (middle), estimated flux (bottom).

In the default case (FIG. 6a), flux deviates from the reference trajectory (equation 4), due to limited bandwidth of control loop, and injection of limited corrective signal. As result, transformer flux goes to saturation, which observed in all phases, with phase A as the worst case at simulated test conditions, overcurrent in phase A can interrupt converter operation.

In the alternative case (FIG. 6b), with introduced predictive control, ACU, using emulation of above process to determine required correction to flux reference, in this case-based on equation 5, with k=1. During the next, delayed voltage change request processing [with the same voltage and flux initial conditions], correction is applied to the flux reference during the transient process. As result, TR flux becomes more balanced in all phases, just touching, but not entering saturation area—full utilization of the transformer magnetic core.

Figure 4:
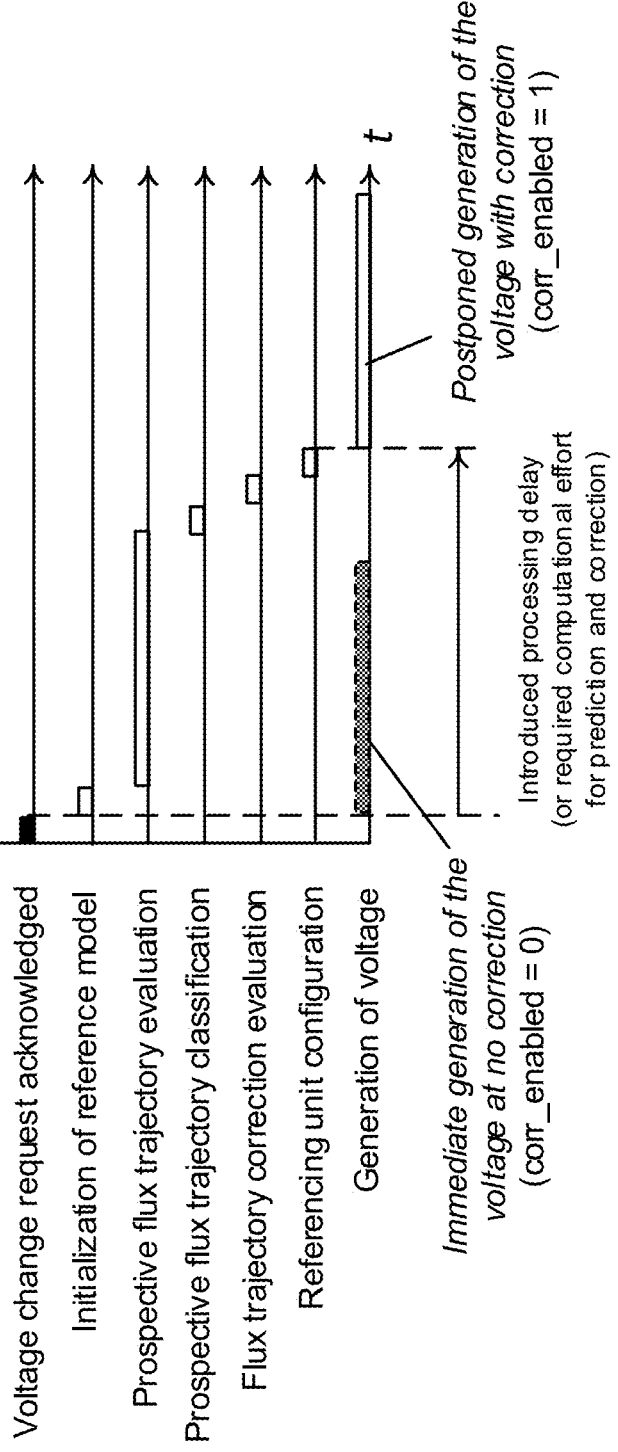
FIG. 4 is a time diagram of system operation in accordance with the disclosure.

Depending on utilized algorithms, as well as scheduling strategy in multi-tasking real time operating system, this procedure [usually] results in certain time delay between voltage change request acknowledgement and its generation with power unit (FIG. 4). Ideally, predictive procedure according to the disclosure can be performed on-line (at the same step of reference processing), but in real system it usually appears to be computationally expensive, thus requires high utilization of controller's resources [such as CPU, operating memory] and can impact overall control stability. In practical cases, predictive procedure can be scheduled to be performed once per certain time, or on request, after collecting all data required for processing, which results in noticeable delay, which still can be acceptable from application point of view. In example implementation of grid simulator control algorithm with prediction and correction of output transformer flux trajectory, based on controller AC 800PEC [2], predictive procedure utilizes pre-configurable reference generator and gets executed every 100 ms, while voltage references are updated every 0.25 ms.

According to an embodiment, the mathematical model of the system (RM) includes a detailed model of the flux control unit and mathematical models of the power electronic converter (PEC) and of the transformer (TR), wherein the flux control unit comprises the reference flux trajectory calculator (RF) and the flux controller (FC).

Preferably in step a) the commanded voltage change is acquired from a pre-determined file, including (optionally, for utilization in RM) expected real time change of physical load of the secondary winding of the transformer (TR).

Preferably in step k) the flux trajectory correction $\Delta\Phi(t)$ is calculated as the solution of the following equation:

$$\Delta\Phi^*(t) = k \cdot \left(\hat{\Phi}_{max} - \hat{\Phi}_{min}\right) = const,$$

with k belonging in a range from 0 to 1 being a correction factor.

Preferably there is a deliberate predictive control procedure between steps d) and e), which requires an additional computational effort to perform steps h), i), j), k), l) resulting in certain time delay between voltage change request acknowledgement and its reproduction by the converter.

The present disclosure also relates to s control system for preventing saturation of a transformer (TR) during fast voltage changes by controlling the magnetic flux of the transformer (TR), said transformer (TR) having a primary winding with a power electronic converter (PEC) configured for receiving a correction signal U** and a secondary winding connected to a load, said system comprising:

measuring or estimating a primary signal (ii), said signal (ii) comprising information of a primary current and/or primary voltage and/or primary phase, on the primary winding of the transformer (TR), a referencing unit (RU) connected to the power electronic converter (PEC), said referencing unit (RU) configured for generating a reference voltage signal U a flux estimator (E) connected to the referencing unit (RU) and configured for receiving the correction signal U** and also configured for receiving the primary signal (ii), wherein the flux estimator (E) is configured for calculating an estimated flux $\Phi$, a reference flux trajectory calculator (RF) connected to the referencing unit (RU) and configured for receiving the reference voltage signal U* and calculating a reference flux $\Phi^*$, a flux controller (FC) connected to the reference flux trajectory calculator (RF) and the flux estimator (E) wherein the flux controller (FC) is configured for receiving a combination of the reference flux $\Phi^*$ from the reference flux trajectory calculator (RF) and the estimated flux $\Phi$ form the flux estimator (E), and wherein the flux controller (FC) is further configured for generating a correction term $\Delta U^*$ based on said combination and outputting the correction term $\Delta U^*$ as a component of the correction signal U**, wherein the system further comprises an additional control unit (ACU) which contains a reference mathematical model of the system (RM), and which is connected to the referencing unit (RU) and to the flux controller (FC), wherein the additional control unit (ACU) is configured for calculating of an expected magnetic flux trajectory $\hat{\Phi}(t)$ using the mathematical model of the system (RM), classifying the expected magnetic flux trajectory $\hat{\Phi}(t)$ so as to predict if saturation of the transformer (TR) is expected to happen by establishing its mean value, its maximal value $\hat{\Phi}_{max}$ and its minimal value $\hat{\Phi}_{min}$ and comparing them against a pre-determined magnetic core saturation limits $\pm\Phi_{sat}$, evaluating a flux trajectory correction $\Delta\Phi^*(t)$ at which saturation would be avoided, or its occurrence would be minimized, and inputting the flux trajectory correction $\Delta\Phi^*(t)$ into the referencing unit (RU) and inputting the flux trajectory correction $\Delta\Phi^*(t)$ into the flux controller (FC) as an additional signal used by the flux controller (FC) to generate the correction term $\Delta U^*$.

The mathematical model of the system (RM) may include a detailed model of the flux control unit and mathematical models of the power electronic converter (PEC) and of the transformer (TR), wherein the flux control unit comprises the reference flux trajectory calculator (RF) and the flux controller (FC).

The additional control unit (ACU) may be configured for calculating the flux trajectory correction signal $\Delta\Phi^*(t)$ as the solution of the following equation:

$$\Delta\Phi^*(t) = k \cdot \left(\hat{\Phi}_{max} - \hat{\Phi}_{min}\right) = const,$$

where k is selected from the range between 0 to 1 and is a correction factor.

In converter-based systems with output transformer rapid changes of converter voltage, performed at arbitrary initial conditions, can cause transformer saturation [for example, at the immediate change of its voltage from zero to the nominal value]. Closed-loop flux control is not always capable to handle residual magnetic flux at such fast transients, because control's performance is limited in real system, as a result, transformer magnetic core can saturate, this causes high currents to flow in transformer winding and potentially interrupt regular operation of the system.

The present disclosure further describes a method for predictive flux control which is capable of bringing the magnetic flux to any dedicated value within normal operational range of magnetization curve, thus solves the above mentioned problem by preventive on-line evaluation and assessment of prospective flux trajectory during transient (this can result in delay between voltage change request acceptance and its processing).

Further, during transient, offset term is added to flux reference such that to keep instantaneous flux within safe limits and thus prevent saturation of the transformer.

The present disclosure utilizes the existing magnetic flux control solution, and additionally manipulates with flux reference in order to achieve the most favorable prospective magnetic flux trajectory during transient, such that for the requested, potentially unfavorable voltage change of high magnitude and/or fast dynamic, saturation of output transformer is prevented.

The embodiments in accordance with the disclosure provide several advantages such as: Prevention of the transformer saturation during dynamic operational modes with very fast voltage parameters change, and therefore, prevention of emergency modes of power converter; Voltage follows the requested reference trajectory profile with limited (parametrizable) deviation, in contrast with emergency mode, when protective action causes significant voltage distortion, or even interruption of regular operation; Processing of repetitive consecutive voltage change requests (series of voltage change) while keeping flux of transformer within acceptable margins; Increasing of allowed voltage change magnitude and dynamic due to rational utilization of transformer magnetic capacity.

The 2nd and 3rd above listed advantages are specific for applications where power converter utilized as controllable voltage source (for example, test stands).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for preventing saturation of a transformer during fast voltage changes by correction of magnetic flux of the transformer, said transformer having a primary winding with a power electronic converter and a secondary winding, by estimating or measuring a primary signal, including a primary voltage on the primary winding of the transformer and a primary current on the primary winding of the transformer, and injecting a correction signal including a correction voltage, into the primary winding of the transformer so as to prevent saturation of the transformer, the method comprising:

acknowledgement of a commanded change of converter voltage, to be applied to the primary winding of the transformer, including initial values of voltage angle, voltage parameters and voltage change parameters on the primary winding of the transformer as the primary signal;

generating a reference signal including a reference voltage signal $U^*$ by a referencing unit;

inputting the reference voltage signal $U^*$ to a reference flux trajectory calculator that calculates a reference magnetic flux $\Phi^*$ based on the reference voltage signal $U^*$;

inputting a combination of the reference magnetic flux $\Phi^*$ and an estimated magnetic flux $\Phi$ to a flux controller that generates a correction term $\Delta U^*$ based thereon;

generating the corrected reference voltage signal, comprising a correction term, $\Delta U^{}$, wherein $U^{}=U^*+\Delta U^*$;

inputting the corrected reference voltage signal $U^{**}$ and a load of the secondary winding of the transformer and its change in time, to a flux estimator, which calculates an estimated magnetic flux $\Phi$ based thereon;

injecting the correction signal through the power electronic converter into the primary winding of the transformer;

wherein an auxiliary predictive control unit (ACU), which contains a reference mathematical model of the system, is configured to:

initialize the reference mathematical model of the system with the acquired initial values of voltage angle and voltage parameters, as well as the acquired or pre-configured voltage change parameters, calculate an expected magnetic flux trajectory $\hat{\Phi}(t)$ using the reference mathematical model of the system;

classify the expected magnetic flux trajectory $\hat{\Phi}(t)$ so as to predict whether saturation of the transformer is expected to happen by establishing its mean value, its maximal value $\hat{\Phi}_{max}$ and its minimal value $\hat{\Phi}_{min}$, and compare them against a pre-determined magnetic core saturation limits $\pm\Phi_{sat}$;

evaluate a flux trajectory correction $\Delta\Phi^*$ (t) at which saturation is avoided or its occurrence is minimized; and input the flux trajectory correction $\Delta\Phi^*$ (t) into the flux controller as an additional signal used by the flux controller to generate the correction term $\Delta U^*$;

wherein injecting the correction signal is initialized with the same initial conditions that are used for the initialization of the reference mathematical model of the system.

2. The method of claim 1, wherein the reference mathematical model of the system includes a detailed model of the flux control unit and mathematical models of the power electronic converter and of the transformer, and wherein the flux control unit comprises the reference flux trajectory calculator and the flux controller.

3. The method of claim 1, wherein during acknowledgement of the commanded change in converter voltage, the commanded voltage change is acquired from a pre-determined file, including expected real time change of physical load of the secondary winding of the transformer.

4. The method of claim 1, wherein during evaluation of the flux trajectory correction $\Delta\Phi^*$ (t), the flux trajectory correction $\Delta\Phi^*(t)$ is calculated according to:

$$\Delta\Phi^*(t) = k \cdot \left(\hat{\Phi}_{max} - \hat{\Phi}_{min}\right) = const,$$

where k is a correction factor selected from between 0 to 1.

5. The method of claim 1, further comprising a deliberate predictive control procedure that requires an additional computational effort and results in a time delay between voltage change request acknowledgement and its reproduction by the converter.

6. A control system for preventing saturation of a transformer during fast voltage changes by controlling a magnetic flux of the transformer, the transformer having a primary winding with a power electronic converter configured for receiving a correction signal $U^{**}$ and a secondary winding connected to a load, the control system comprising:

a device configured to measure or estimate a primary signal comprising information of a primary current and/or primary voltage and/or primary phase, on the primary winding of the transformer;

a referencing unit connected to the power electronic converter, the referencing unit configured for generating a reference voltage signal U;

a flux estimator connected to the referencing unit and configured for receiving the correction signal $U^{**}$ and also configured for receiving the primary signal;

wherein the flux estimator is configured for calculating an estimated magnetic flux $\Phi$, a reference flux trajectory calculator connected to the referencing unit and configured for receiving the reference voltage signal $U^*$ and calculating a reference magnetic flux $\Phi^*$;

a flux controller connected to the reference flux trajectory calculator and the flux estimator;

wherein the flux controller is configured for receiving a combination of the reference magnetic flux $\Phi^*$ from the reference flux trajectory calculator and the estimated magnetic flux $\Phi$ from the flux estimator;

wherein the flux controller is further configured for generating a correction term $\Delta U^*$ based on said combination and outputting the correction term $\Delta U^*$ as a component of the correction signal $U^{**}$;

an additional control unit that contains a reference mathematical model of the system and that is connected to the referencing unit and to the flux controller;

wherein the additional control unit (ACU) is configured
to:
  calculate an expected magnetic flux trajectory $\hat{\Phi}(t)$
    using the reference mathematical model of the sys-
    tem;
  classify the expected magnetic flux trajectory $\hat{\Phi}(t)$ to
    predict whether saturation of the transformer is
    expected to happen by establishing its mean value,
    its maximal value $\hat{\Phi}_{max}$ and its minimal value $\hat{\Phi}_{min}$
    and compare them against a pre-determined mag-
    netic core saturation limits $\pm\Phi_{sat}$;
  evaluate a flux trajectory correction $\Delta\Phi^*$ (t) at which
    saturation is avoided or its occurrence is minimized;
    and
  input the flux trajectory correction $\Delta\Phi^*$ (t) into the
    referencing unit and input the flux trajectory correc-
    tion $\Delta\Phi^*$ (t) into the flux controller as an additional
    signal used by the flux controller to generate the
    correction term $\Delta U^*$.

7. The system according to claim 6, wherein the reference
mathematical model of the system includes a detailed model
of the flux control unit and mathematical models of the
power electronic converter and of the transformer; and
wherein the flux control unit comprises the reference flux
trajectory calculator and the flux controller.

8. The system according to claim 6, wherein the additional
control unit is configured for calculating the flux trajectory
correction signal $\Delta\Phi^*$ (t) according to:

$$\Delta\Phi^*(t)=k\cdot(\hat{\Phi}_{max}-\hat{\Phi}_{min})=const,$$

where k is a correction factor between 0 and 1.

\* \* \* \* \*